(12) United States Patent
Park et al.

(10) Patent No.: US 12,122,074 B2
(45) Date of Patent: Oct. 22, 2024

(54) SCALABLE TOOLING SYSTEM USING HIGHLY PARALLEL CONVECTION HEATING FOR PROCESSING OF HIGH TEMPERATURE COMPOSITE MATERIALS

(71) Applicant: JANICKI INDUSTRIES, INC., Sedro-Woolley, WA (US)

(72) Inventors: John Park, Sedro-Woolley, WA (US); Todd Chace, Sedro-Woolley, WA (US); Brian Holmes, Sedro-Woolley, WA (US); Robert Parsons, Sedro-Woolley, WA (US)

(73) Assignee: Janicki Industries, Inc., Sedro-Woolley, WA (US)

( * ) Notice: Subject to any disclaimer, the term of this patent is extended or adjusted under 35 U.S.C. 154(b) by 318 days.

(21) Appl. No.: 17/177,223

(22) Filed: Feb. 17, 2021

(65) Prior Publication Data
US 2022/0097321 A1 Mar. 31, 2022

Related U.S. Application Data
(60) Provisional application No. 63/085,326, filed on Sep. 30, 2020.

(51) Int. Cl.
*B29C 35/00* (2006.01)
*B29C 35/04* (2006.01)
*B29C 70/44* (2006.01)

(52) U.S. Cl.
CPC .......... *B29C 35/045* (2013.01); *B29C 35/002* (2013.01); *B29C 70/443* (2013.01); *B29C 2035/046* (2013.01)

(58) Field of Classification Search
CPC ................... B29C 35/0288; B29C 2035/0811
See application file for complete search history.

(56) References Cited

U.S. PATENT DOCUMENTS

| | | | |
|---|---|---|---|
| 4,621,995 A | 11/1986 | Wersosky | |
| 6,320,165 B1 | 11/2001 | Ovadia | |
| 9,034,234 B2 | 5/2015 | Halford | |
| 10,543,647 B2* | 1/2020 | Matsen | ................. B29C 70/345 |
| 2010/0201040 A1* | 8/2010 | Guichard | ............ B29C 35/0805 |
| | | | 425/117 |

(Continued)

OTHER PUBLICATIONS

Advanced heating system and control mode for homogeneous high temperature curing of large composite repairs https://cordis.europa.eu/project/id/271691/reporting Reference Date: Jun. 11, 2015 Retrieval Date: May 12, 2022.

(Continued)

*Primary Examiner* — Alison L Hindenlang
*Assistant Examiner* — Debjani Roy

(57) ABSTRACT

The present example provides a scalable tooling system using highly parallel convection heating for processing of high temperature composite materials. A single-sided mold is provided with vacuum pressure to cast and consolidate a raw material. The mold is integrally heated by a plurality of discretized heat sources providing a plurality of convection airflow sources to minimize the hot and cold spots inherit to typical convection oven processing. Airflow is arranged by orifices aligned conformally to the mold's profile surface such that rapid heating rates may be achieved while maintaining temperature control along the mold surface.

14 Claims, 12 Drawing Sheets

(56) References Cited

U.S. PATENT DOCUMENTS

| | | | | |
|---|---|---|---|---|
| 2012/0025428 A1* | 2/2012 | Feigenblum | ........ | B29C 35/0805 |
| | | | | 425/40 |
| 2015/0224681 A1* | 8/2015 | Halford | ............... | B29C 35/0266 |
| | | | | 425/144 |
| 2016/0031122 A1* | 2/2016 | Halford | ............... | B29C 35/0294 |
| | | | | 264/327 |

OTHER PUBLICATIONS

Electroimpact, Toray, Janicki advance technologies for rapid, large scale thermoplastic parts manufacture https://www.compositesworld.com/news/electroimpact-toray-and-janicki-advance-processing-technologies-for-rapid- large-scale-thermoplastic-part-manufacture Reference Date: Sep. 7, 2021 Retreival Date: May 12, 2022.

Toray Develops New Out of Autoclave Technology for CFRP https://www.toraycma.com/toray-develops-new-out-of-autoclave-technology-for-cfrp/ Reference Date: Apr. 3, 2018 Retrieval Date: May 12, 2022.

\* cited by examiner

SCALABLE TOOLING SYSTEM USING HIGHLY PARALLEL CONVECTION HEATING FOR PROCESSING OF HIGH TEMPERATURE COMPOSITE MATERIALS

TECHNICAL FIELD

This description relates generally to molding of composite materials and more specifically to self-heated tooling for large dimension molds for thermoplastic composites.

BACKGROUND

Composites are materials made up of two or more components that retain their separate and distinct properties when combined. In the most common situations composite materials include reinforced concrete (cement and rebar), reinforced fiberglass (glass fiber and resin), and carbon fiber reinforced polymer (carbon fiber and resin)). As materials science has advanced, composite materials have in many instances overtaken aluminum as the production material of choice in the aviation and transportation industries, to name a few.

Uncured fiber reinforced composite materials may typically appear as one or more laminated fiber sheets surrounded by a resinous material in an uncured state. Alternatively, sheets may be built up or laid up to any desired thickness. When heated the materials will soften and flow and can be molded without degradation of their properties into a desired shape. When cooled, the material typically solidifies into the finished shape.

In particular, finished fiber reinforced composite materials are known for being exceptionally strong, lightweight, chemically resistant, and thermally stable. Put together, these properties make composites an excellent choice for high-performance mechanical structures such as airplanes, automobiles, and wind turbines. Year upon year, industry adoption of composite materials has increased through continuously novel and challenging applications.

Molds heated in ovens may be used to form fiber reinforced composite materials into a desired shape. Unfortunately in forming large pieces, or complicated shapes, heat distribution and accordingly curing is typically not uniform, or consistent. Typically, all parts of a tool must be brought up to the desired temperature to successfully process the material. Non-uniform heating may result in longer duration cycle times while waiting for all parts of the tool to get up to temp. Long heating times tend to decrease manufacturing throughputs, and may increase energy expenditure in forming parts. Accordingly, it would be desirable to have a device to process large dimension, thermoplastic composite laminates with a decreased cycle time.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a scalable tooling system using parallel (or equivalently termed "distributed" herein) convection heating for processing of high temperature composite materials. A single-sided mold may be provided with vacuum pressure to cast and consolidate a raw material. The mold may be heated by air which has been heated by a plurality of discretized heat sources. Convection airflow passes through a plurality of nozzles and are directed to portions of the mold. Each nozzle can include an airflow orifice and or heat element. Directed airflow tends to minimize the hot and cold spots typically found in convection oven processing of composite materials. Airflow may be controlled by orifices conforming to the mold's profile surface such that rapid heating rates may be achieved while maintaining uniform temperatures along the mold surface. Feedback may be used to control the mold heating of one or more of the heat sources.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
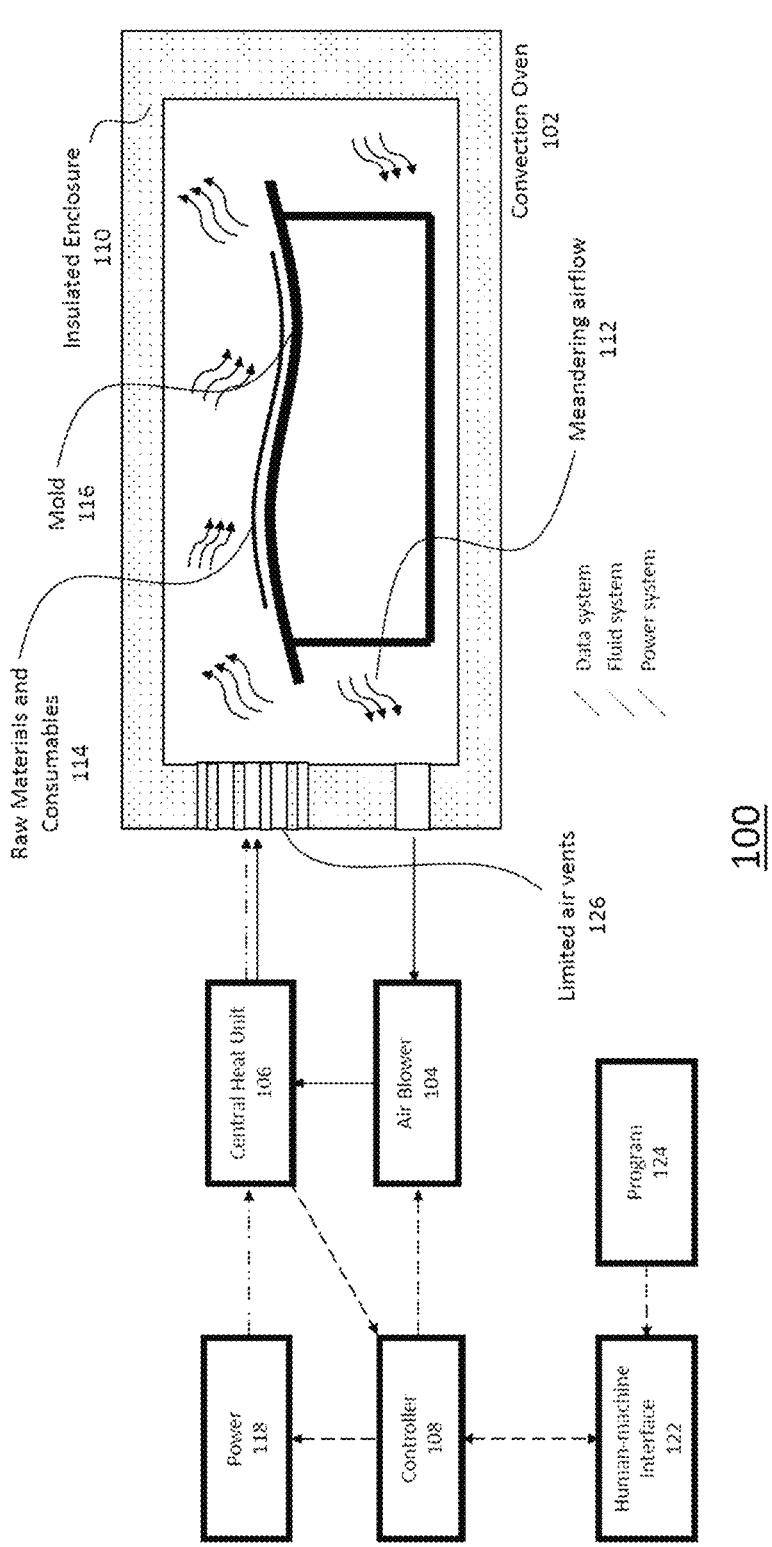
FIG. 1 is a system block diagram showing the conventional convection heating of composites to form a part.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a scalable tooling system using parallel (or equivalently "distributed") convection heating to processing of high temperature composite materials. Although the present examples are described and illustrated herein as being implemented in an aerospace parts molding system, the system described is provided as an example and not a limitation. As those skilled in the art will appreciate, the present examples are suitable for application in a variety of different types of fiber reinforced composite materials molding systems.

Materials suitable for molding as described below may include fiber reinforced composite materials including thermoset composites, and the later developed thermoplastic composites ("TMCs"), utilizing thermoplastic resin. Advantageously, thermoplastic curing may be reversed. Thermoplastics typically become pliable and may be molded at elevated temperatures and solidify upon cooling. In addition to being able to be remolded, thermoplastic composites are lightweight, have good strength, are tough, have environmental resistance, and can be customized to suit specific temperature ranges and environments. Thermosetting polymer materials, utilizing thermosetting resins, on the other hand go to a solid state that is not reversible as irreversible chemical bonds are formed during curing. Thermoset and thermoplastic resins also have additional differences related to their processing characteristics. Both types of fiber reinforced composite materials may be molded into many useful shapes.

As mentioned above, thermoset resins, such as epoxies, have previously been used in TMCs. These resins are capable of excellent performance, but they have an inherit limitation: processing speed. For high performance chemistries, a heat cycle is required in order to develop material properties; this process is known as cure. The heat cycle consists of engineered temperature ramps and dwells on the order of 1-5° F./min up to 350° F. with dwells ranging from 2 to 10 hours. During this heat cycle, a combination of vacuum and external pressure may be used to minimize porosity within the material. The desired cast shape is obtained by use of a hard mold, typically machined to size. A common heat cycle ranges from 6 to 12 hours. Heat cycles tend to increase with increased mold sizes used for forming larger parts. As used herein large parts are typically of scale exceeding suitability for mechanical press forming, or its variations, as known to those skilled in the art.

Lately thermoplastic resins, such as PEEK, PEKK, and PAEK, are emerging as a unique alternative to thermoset resins. Unlike thermosets which require a long cure process, thermoplastic resins are processed by melt fusion and crystallization. This process is tolerant of heating rates in excess of 100° F./min and temperature dwells as short as 5 minutes in the 500-750° F. range. Heat cycles for thermoplastic composites may be as short as 1 hour to form a laminate with similar structural properties as epoxy resin composites. However, these processing rates may only be achieved with careful attention to temperature uniformity and control. Heat cycles tend to increase with increased mold sizes used for forming larger parts of this material as well.

FIG. 1 is a system block diagram showing the conventional convection heating of composites to form a part 100. One method for consolidating composites is with the use of a convection oven 102. The conventionally constructed convection oven 102 is typically configured with a conventionally constructed air blower 104, a conventionally constructed single central heat unit 106, and a conventionally constructed logic controller 108. The convection oven 102 includes a thermally insulated vessel 110, and conventionally constructed air vents 126. A conventionally constructed power supply 118 typically provides centralized power distribution to the i9various components. A conventionally constructed human machine interface 122 may be provided to allow monitoring of and input to the system 100. The controller 108 may include a conventionally constructed set of program instructions to control oven 102 operation in a conventional manner.

The power supply 118 is coupled to a central heat unit 106. Central heat unit couples data to controller 108 and convection oven 102. Central heat unit 106 may also couple power to the convection oven 102.

The controller 108 may include data links to the power module 118 and the human machine interface 122. The controller may also be coupled to the air blower 104 to control its operation. The controller 108 may also receive information from the central heat unit 106. The controller may include conventional programming 124 to control oven temperature, and otherwise operate the oven 102 in a conventional manner.

The human machine interface 122 may be a screen and keyboard, a touch screen, a single line display, and or dedicated switches to provide input to, and receives input from the controller 108.

The air blower 104 receives data from the oven 102 and from the controller 108. The air blower 104 may also provide data control signals to the central heat unit 106.

The central heat unit 106 receives power from the power module 118, and provides power to the convection oven 102. Central heat unit 106 also provides data to the controller 108, and to the convection oven 102.

In the convection oven 102, hot air 112 is directed via a blower 104 into the vessel heating the materials 114 placed within it. A typically limited set of air vents 126 may be present to circulate airflow within the insulated enclosure 110. This fixed air flow pattern, due to pre-configured vent configurations, may only be changed by adjusting placement of the mold 116 within the oven 102. Typical convection ovens 102 may be designed to process anything that fits within the vessel's interior with little ability for customization by the user. Airflow 112 is generally poorly distributed and, consequently, the local rate of heat transfer varies significantly across the part and mold. This variation of heat transfer leads to localized hot spots and cold spots during heating and cooling of the materials 114 and mold 116. Put another way the poor heat transfer leads to major temperature variations within the laminate materials 114 during processing. Also the time in the oven is typically set by the portion of the mold that, due to placement and airflow within the oven, takes longest to heat up. As the vessel's volume increases to accommodate larger molds temperature variations in the conventional convection oven 102 become more pronounced and process control may be increasingly difficult.

The mold 116 is typically constructed from steel, invar, aluminum or other suitable materials. The mold provides a surface in the shape of a desired part, so that unprocessed materials 114 disposed on the mold conform to the shape of the mold surface at select processing temperature to produce a part after heating, consolidation, and cooling that results in a port of the correct shape at room temperature by completion. Molds used are typically single sided and may be compensated for thermal expansion, dimensional springback, shrink, or other process-related shape effects. The molds described herein are typically of a form that allows for the lay up of materials, and are not of the type of mold into which a liquid that later solidifies is poured.

Also of note, in other known processing methods a process rate of 1 hour may be achievable. Short cycle times have been achieved by approaches such as press molding (not shown) by heated die. By this method, the raw material is cast to shape with two complementary mold halves which are pre-heated and pressed together by mechanical actuation to pressure in excess of 200 psi. Current prices for complementary heated molds and compatible presses are economical for relatively small part dimensions. For large dimensions, theses prices become prohibitively expensive due to the manufacturing complexities of fabricating large complementary mold halves and high capacity presses. Accordingly, a better system and method for producing large parts may be desirable.

Figure 2:
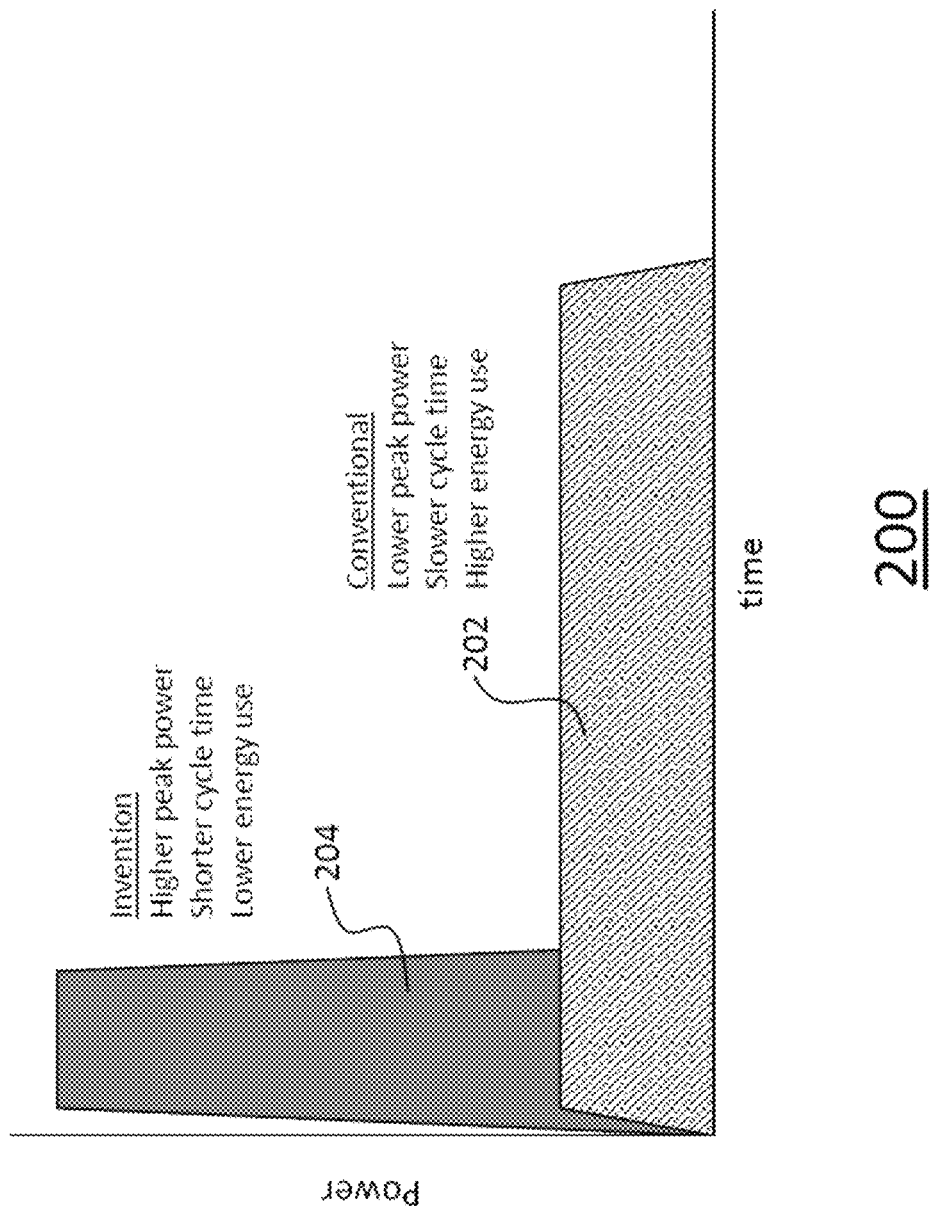
FIG. 2 shows a graph comparing typical conventional convection oven power profile to that of the invention described herein.

FIG. 2 shows a graph 200 comparing typical conventional convection oven heating profile for a molded part 202 to the heating profile of the invention 204 described herein. The area under each curve represents the energy that is applied in the heating process to mold a part. The energy applied in the conventional process 202 is typically greater than that of the invention 204. Also, the conventional process typically operates at a lower power level but is applied over a longer time. The process of the invention 202 typically allows a higher level of power to be applied over a shorter time, which typically provides an advantage in increasing production throughput.

To minimize the influence of hot and cold spots in a conventional system (100 of FIG. 1) that adversely affect formation and curing, heating rates (as expressed by the power level vertical axis) are generally reduced and dwell times extended in time well beyond the requirements of the resin in order to guarantee thermal uniformity of the materials in process. Improper thermal control of the resin heating process may lead to large process-induced internal stresses capable of damaging the finished laminate or leading to premature failure of the part.

By the system and method of the invention described herein in the following paragraphs, there is a reduction in heat cycle time compared to conventional thermoset composite processing. The new system and method of a scalable tooling system using highly distributed convection heating for processing of high temperature composite materials may be especially advantageous in forming large parts.

This invention addresses a gap in processing capability for large dimension, short cycle time composite laminates. A single-sided mold may be used with vacuum pressure to cast and consolidate the raw material. The mold is integrally heated by multiple streams of convection airflow to minimize the hot and cold spots inherit to typical convection oven processing. Airflow may be arranged by multiple orifices aligned conformally to the mold's profile surface such that rapid heating rates may be achieved while maintaining uniform temperatures along the mold surface. This invention, while designed for thermoplastic composites, may be suitable to other materials processes where cast shape, heat uniformity, and short cycle time are desired.

Figure 3:
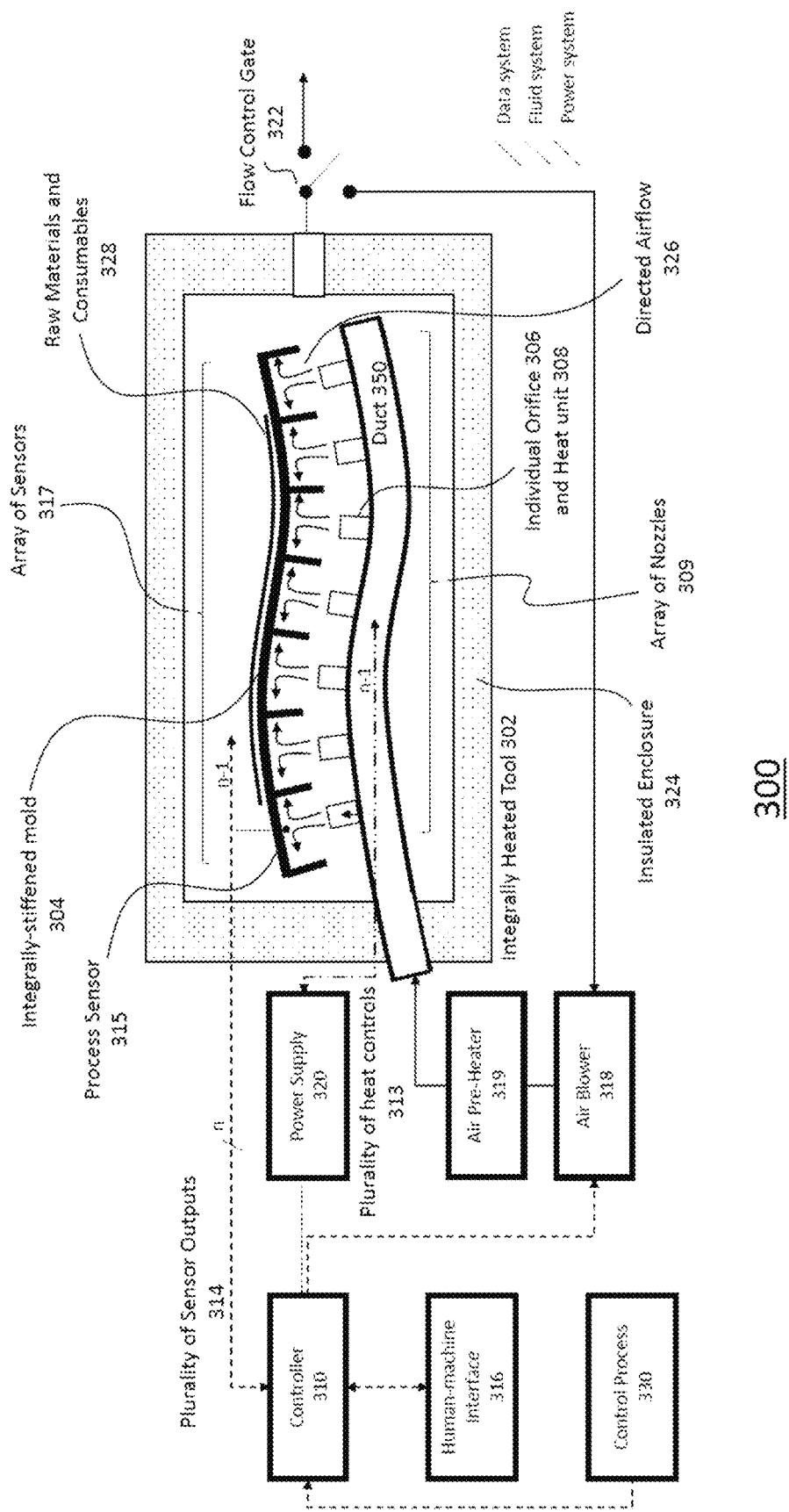
FIG. 3 is a system block diagram showing the unique scalable tooling system using highly parallel or distributed convection heating for processing of high temperature composite materials as further described herein to form a part.

FIG. 3 is a system block diagram showing the unique scalable tooling system using parallel convection heating for processing of high temperature composite materials to form a part, or work piece 300. The system and method is particularly useful in processing large parts. The system and method 300 may include a conventionally controlled power supply 320, and a conventionally constructed controller 310 that may be configured to implement unique processing instructions 330 that controls the set up and processing of the materials and consumables 328 disposed on the integrally-stiffened mold 304. Also provided is a conventionally constructed air blower 318, a conventionally constructed flow control gate 322, an insulated enclosure 324, and an integrally heated tool 302. Also included is a human machine interface 316 that aids in the set up and control of the system and method, typically utilizing a graphical user interface ("GUI") (not shown) or the like.

The integrally heated tool 302 may include an air duct 350 including an array of nozzles 309, an integrally-stiffened mold 304, and an array of sensors 317. The array of nozzles may include a plurality of individual orifices 306 and or heat elements 308 coupled to the air duct 350. The array of sensors 317 may include an array of process sensors 315. The total number of heat units 308 is variable, and generally denoted as "n" heaters collectively referred to as having a plurality of heater controls 313. The total number of sensors 315 is variable, and generally denoted as "n" sensors collectively referred to as having a plurality of sensor outputs 314. Each sensor 315 is generally paired with a heat unit 308/orifice 306 combination as part of a control loop path.

The integrally heated tool 302 is advantageously constructed to include an array of individually controlled nozzles 309. The nozzles 309 may be arranged by methods known to those skilled in the art to provide a desired heating in the materials 328 being molded on a top side of the mold 304. A corresponding array of temperature sensors 317 may be disposed adjacent to a paired heat source 306, typically on a rear mold surface, to measure the temperature reached at a given location on a rear surface of the mold 304 being heated by a corresponding heat source. The process 330 to monitor and control heating may be implemented by the controller 310 to control the heating of the raw materials 328 placed on the mold to provide a desired curing profile (stored in the controller) for the part being formed.

Each sensor of the array of sensors includes an output signal of an array of output signals 314 that are each indicative of mold temperature at a given location. The sensor and portion of the mold being heated is heated by a corresponding heat unit 308. An array of heaters 309 provides an array of heat sources that heats each adjoining surface of the mold 304 producing a plurality of temperature sensor outputs indicative of mold temperature at the corresponding sensor location.

Temperature applied to the molded materials 328 is controlled via a heated airflow directed to the surface of the mold 304 flowing through a heat unit 308 disposed in an orifice 306. Typically the ducted airflow 350 is directed to each heater in the array of heaters and is selectively heated by a heat source over which the air flows. Baffles on the rear side of the mold tend to direct the airflow to desired areas of the mold and away from adjacent areas to minimize heating from sources not under control of the paired sensor.

The temperature measured by each sensor may be routed to the controller 310 where it may be used to generate a control signal by methods known to those skilled in the art, that is coupled to the power supply 320 that in turn controls the power applied to the heater to either increase/decrease/or maintain a given mold temperature at the sensor location. The sensors are distributed in an array or matrix 317 over the back side of the mold 304. The distribution need not be regular, and there can be an unheated space or area between heat sources. However, in the example shown the heaters are distributed uniformly, and the heat sources are contiguous. A control system is formed where a control loop is formed for each heater/sensor combination, and in which the temperatures are considered as a whole to produce a desired curing profile for the entire mold.

The power supply 320 typically has multiple outputs and is conventionally constructed and digitally controlled. It has a plurality of individually controlled outputs coupled to each of the plurality of discrete heat units 308, in the simplest configuration there is one control output coupled to one heat unit for the entire system. The wattage of each of the plurality of power supply outputs may be of substantially the same wattage, or of differing wattage as desired to obtain proper processing. In alternative examples the output wattage may be fixed or variable. The source of power may be electric, chemical or equivalent. The power supply 320 is coupled to and receives a control signal, or signals from the controller 310. The control signal may be digital and of serial or parallel nature. Alternatively, the control signals may be analog control signals corresponding to each power supply output to be controlled.

Inputs to the power supply include that derived from the mold sensors 317 (each of which is paired with adjacent heat units 308), as processed by the controller 310. Temperature data coupled to controller 310 allows the heat applied at a given location on the mold 304 to be controlled individually and separately from the other sensor heater pairs as dictated by the controller 310, and the process 318 being implemented on it.

The controller 310 may be coupled to a plurality of sensors 317. The controller 310 may also be coupled to the power supply 320, human-machine interface 316. The controller 310 may also be coupled to the air blower 318 and flow control gates 322 to control its operation. The controller 310 may also receive temperature information indicative of the status of the discrete heat units 308. The controller may include unique programming to implement a process for setting up and operating the controller 318, to control process parameters and otherwise operate the tool system 300. The controller 310 may take a variety of forms, including that of commonly available digital controllers, PC based controllers, PLC, or other equivalent microprocessor based controllers. In particular in the case of a microprocessor based controller a master controller may direct operation of one or more slave controllers. In the case of industrial based controllers, such controllers may be equipped with various input and output interface cards, specially configured or selected, such as would be encountered or needed in controlling various industrial processes and systems.

The human-machine interface 316 may be a screen and keyboard, a touch screen, a single line display, and or dedicated switches to provide input to, and receive input from, the controller 310. In particular a graphical user interface ("GUI") interface specially constructed may be implemented to display on the interface 316. Also the interface may be voice operated, or responsive, and provide audible and or visual alerts if desired. The interface may be further configured to load data into the system, and collect data and record it on a storage device.

The air blower 318 receives data from the integrally heated tool 302, controller 310, and flow control gates 322. The air blower 318 may also provide data control signals to the controller 310 and flow control gates 322.

The air flow control gates 322 receive data from the integrally heated tool 302, controller 310, nozzles 309, and air blower 318. Gates 322 may be operated such that air may be recirculated within the integrally heated tool system and or ambient temperature air from the environment is introduced. The gates 322 may also provide data control signals to the controller 310 and air blower 318 indicative of their condition, flow through the gate, and other desired information.

The discrete heat units 308 receive power from the power supply 320 as determined by the controller 310 based on the condition of the multitude of sensors 314. The discrete heat units 308 heat air directed to the mold 304. The discrete heat units 308 may also provide data to the controller 310.

In the integrally heated tool 302, air is directed via air blower 318 directly to the integrally stiffened mold 304 by way of an array of orifices 306. The array of orifices 306 are aligned conformally to the integrally stiffened mold 304 profile such that directed airflow patterns 326 at each orifice are self-similar. This configuration of orifices 306, paired with discrete heat units 308, substantially homogenizes the local rate of heat transfer across the part and mold. Improved uniformity of heat transfer rate inherently leads to a reduction of localized hot and cold spots typical in conventional convection oven systems (100 in FIG. 1). In alternative examples the local heat transfer rates or temperatures may be intentionally altered to create a specific pattern of hot and cold spots across the part and mold depending on the desired characteristics of the mold and process.

The mold 304 is typically constructed from steel, invar, aluminum, or the like. The mold provides a surface in the shape of the desired part. The mold 304 surface may be compensated to offset manufacturing-induced warpage. Unprocessed materials and consumables 328 are typically dispensed on the mold with vacuum pressure to produce a part after heating has been completed. Molds are typically single sided but may be double-sided to obtain certain part or tool system functionalities. The underside of the mold 304 is geometrically stiffened such that each stiffening element is aligned in accordance the array of orifices 306 configured to it.

Figure 4:
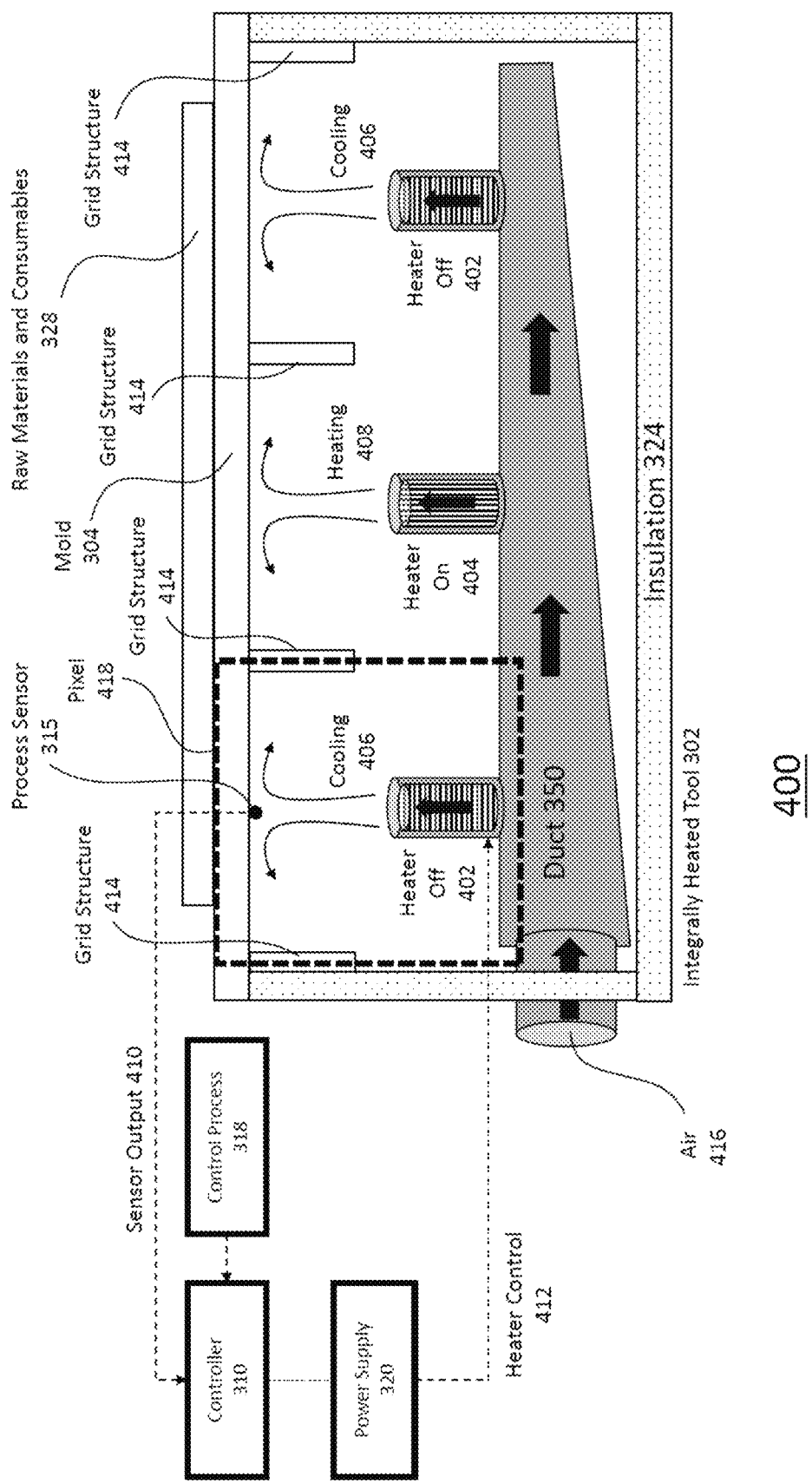
FIG. 4 shows a pictorial example of airflow to several discrete heating elements.

FIG. 4 shows a pictorial example of airflow to several discrete heating elements 400. The control loop 410, 412 for controlling the temperature at each location, or zone, on the mold is shown and applies to each heating location on the mold. As many or as few heating locations may be utilized depending on the desired characteristics of the mold the process it is being applied to. Air 416 flows into a duct 350 where it is distributed to a plurality of nozzles 418. Each discrete zone has a heater that is either on 404 or off 402, heating 408 or cooling 406 its respective discrete zone 418.

Sensor 315 provides a signal output, typically corresponding to temperature 410 that is applied to a controller 310. Sensor 315 may be a thermocouple or equivalent. A control signal from controller 310 is generated and applied to the power supply 320, creating heater control signal 412 from the power supply 320 to the integrally heated tool 302.

A side view of the grid structure 414 that may form cavities or indentations on the rear surface of the mold 304 helps localize air from the nozzle to a given mold location and away from adjacent zones. The pairing of the heater directing air to a specific area of the mold tends to form a grid element or heating zone 414, as each nozzle tends to be directed to a pocket formed by the grid it is opposite to. There are many such zones on a given tool 302, as needed to process a given part. After the air hits the back of the mold it is directed away from the mold by the back of the mold and walls of the grid structure 414 where it exits the mold through a return manifold. The grid structure tends to prevent heated air form a given source from contributing to the heating of an adjacent grid element, further allowing control of the heating process. Since the air is directed away from the mold it tends not to interfere with the heating or cooling of adjacent zones. In its simplest configuration, air flow may to be constant with the heat being varied by gating the heating coil on and off. Typically the heating coils may be off 402, or on 404 depending on what is desired by the process control 318.

Figure 5:
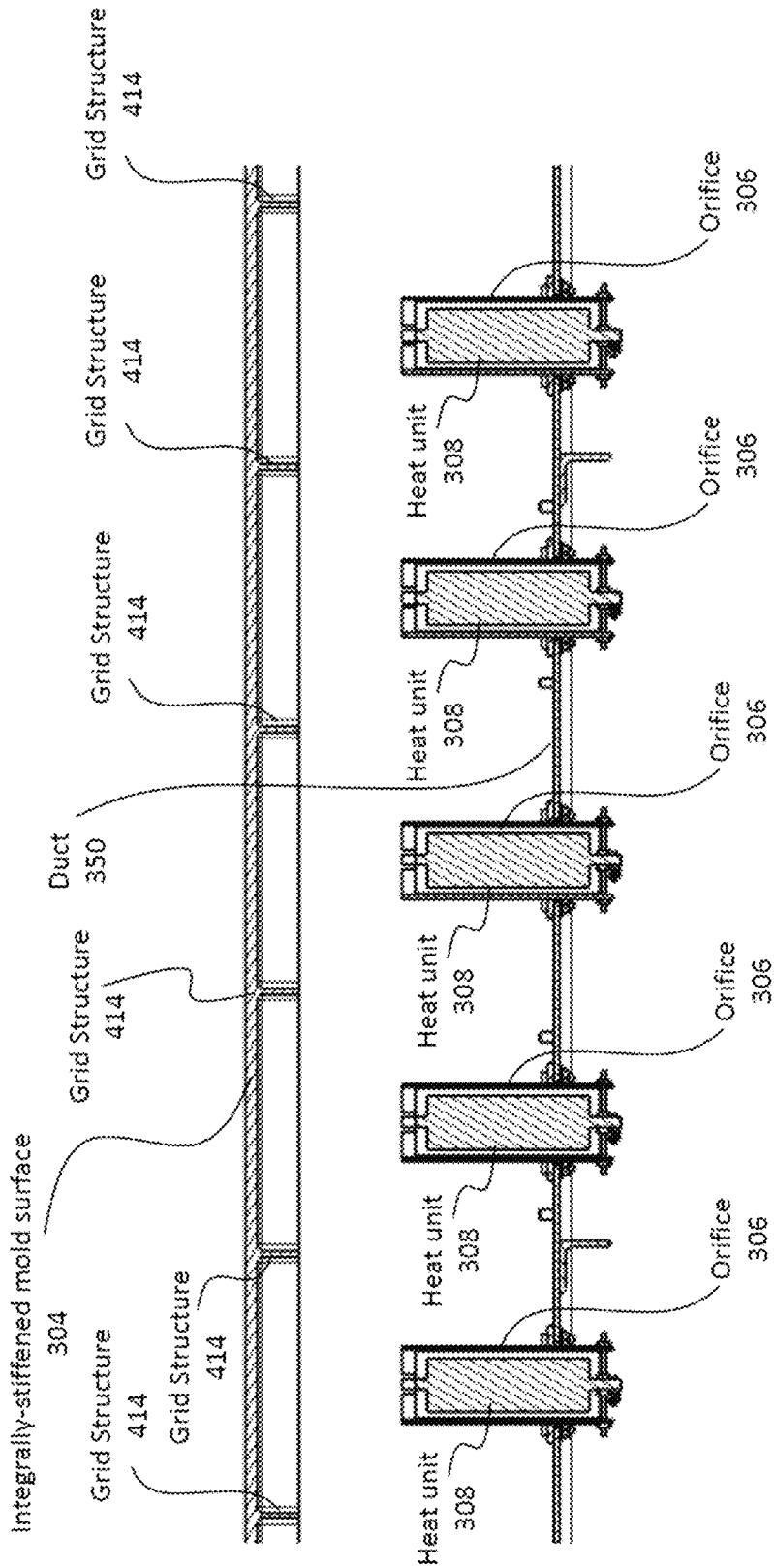
FIG. 5 shows an example of a heating configuration where discrete heating units are disposed at orifices.

FIG. 5 shows an example of a heating configuration, or heater array 500 in cross section. An individual heat unit 308, of the heater array 500 may be located with an orifice 306 and aligned to the mold's 304 underside grid structure 414. Heat units 308 may be positioned in any desired arrangement, in a line in a planar configuration, or in three dimensions for example. As many or as few heat units, orifices, and or grid structures may be used depending on the desired characteristics of the mold and process it is being applied to. Furthermore, heat unit 308 may be located outside of the orifice 306. The orifices may be sized to provide a desired air velocity, as is known to those skilled in the art.

For complex mold geometries such as angled, lofted or contoured profiles, the duct 350 typically conforms to the mold profile by constant or variable offset. The orifice 306 and heat unit 308 corresponds to the duct profile such that airflow characteristics are satisfied.

Figure 6:
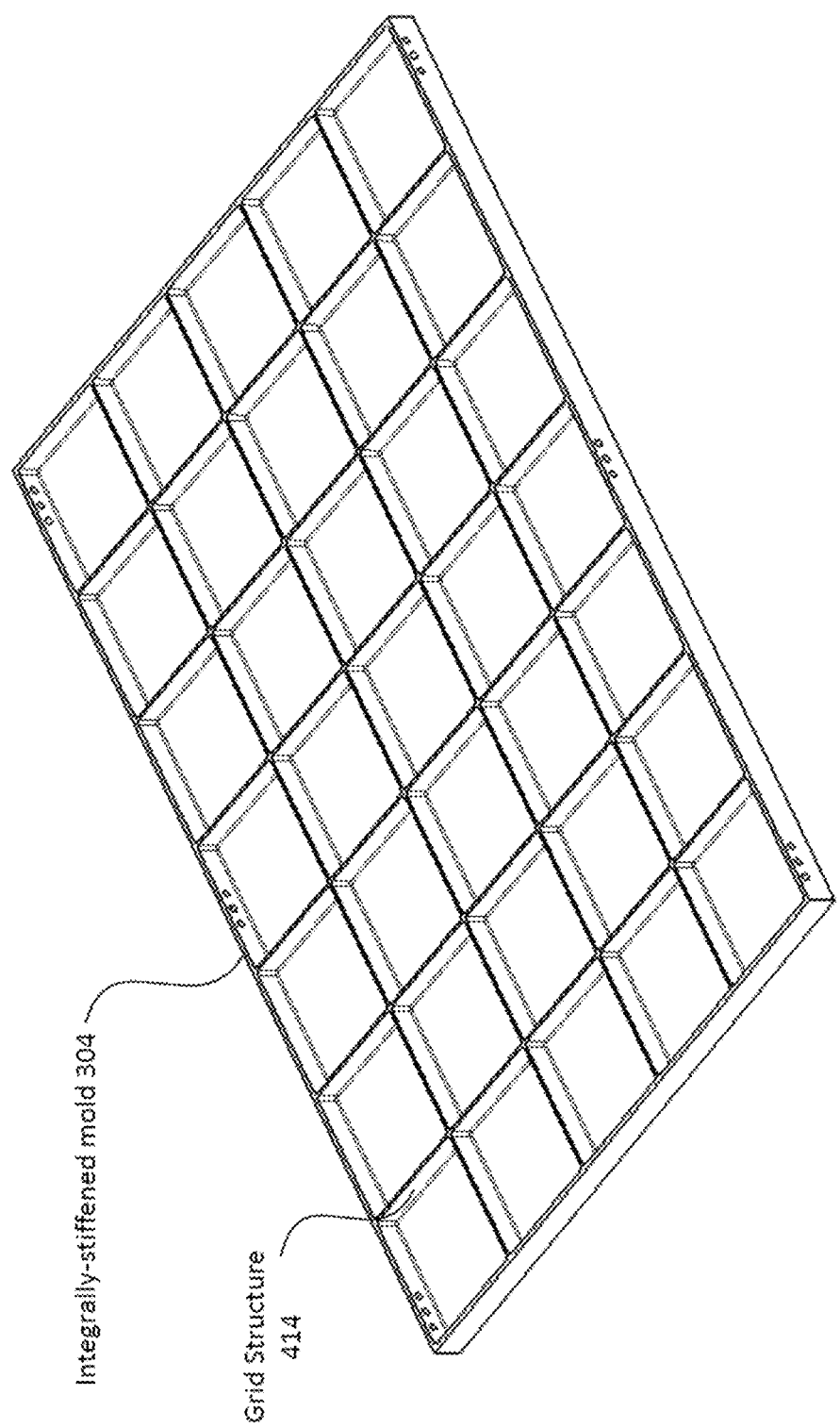
FIG. 6 shows an example of a mold underside geometry that interacts with a discretized heating airflow.

FIG. 6 shows an example of a mold 304 underside containing a grid or matrix structure 414. The grid structure material is typically similar, but not limited, to that of the mold 304 construction. The grid structure forms a cavity or well structure that assists with air flow (416 in FIG. 4) tending to block airflow from adjacent grids. The grid structure 414 also tends to add stiffness sufficient to support the mold structure throughout use. The shape of the grid structure may take any form: square, triangular, hexagonal, or otherwise. Furthermore, the grid shape pattern and distribution may be variable depending on the desired characteristics of the mold and process it is being applied to. In this example the grid structure is square, uniformly distributed, uniformly spaced, and contiguous.

Figure 7:
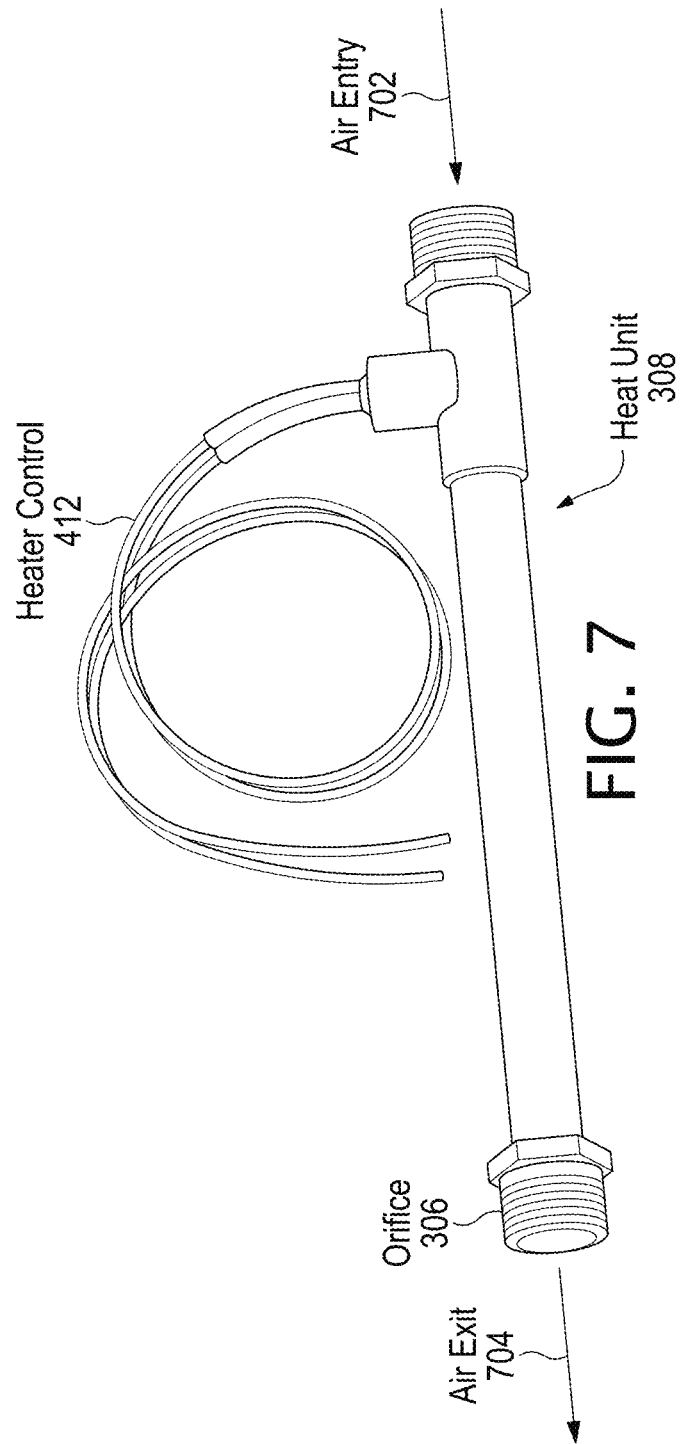
FIG. 7 shows an exemplary heater.

FIG. 7 shows an example of a heat unit 308 and orifice 306. The heat unit typically has output sufficient to heat air to temperatures suitable for processing, as is known to those skilled in the art. The heater has a heating element (not shown) typically of the electrical resistance type or equivalent alternative and is typically turned on or off as determined by the heater control signal 412 applied to it. The orifice 306 is typically constructed from steel, invar, aluminum, or the like. The size and dimensions of the orifice are typically complementary to the heat unit to obtain appropriate air temperature and velocity at the air exit 704.

Figure 8:
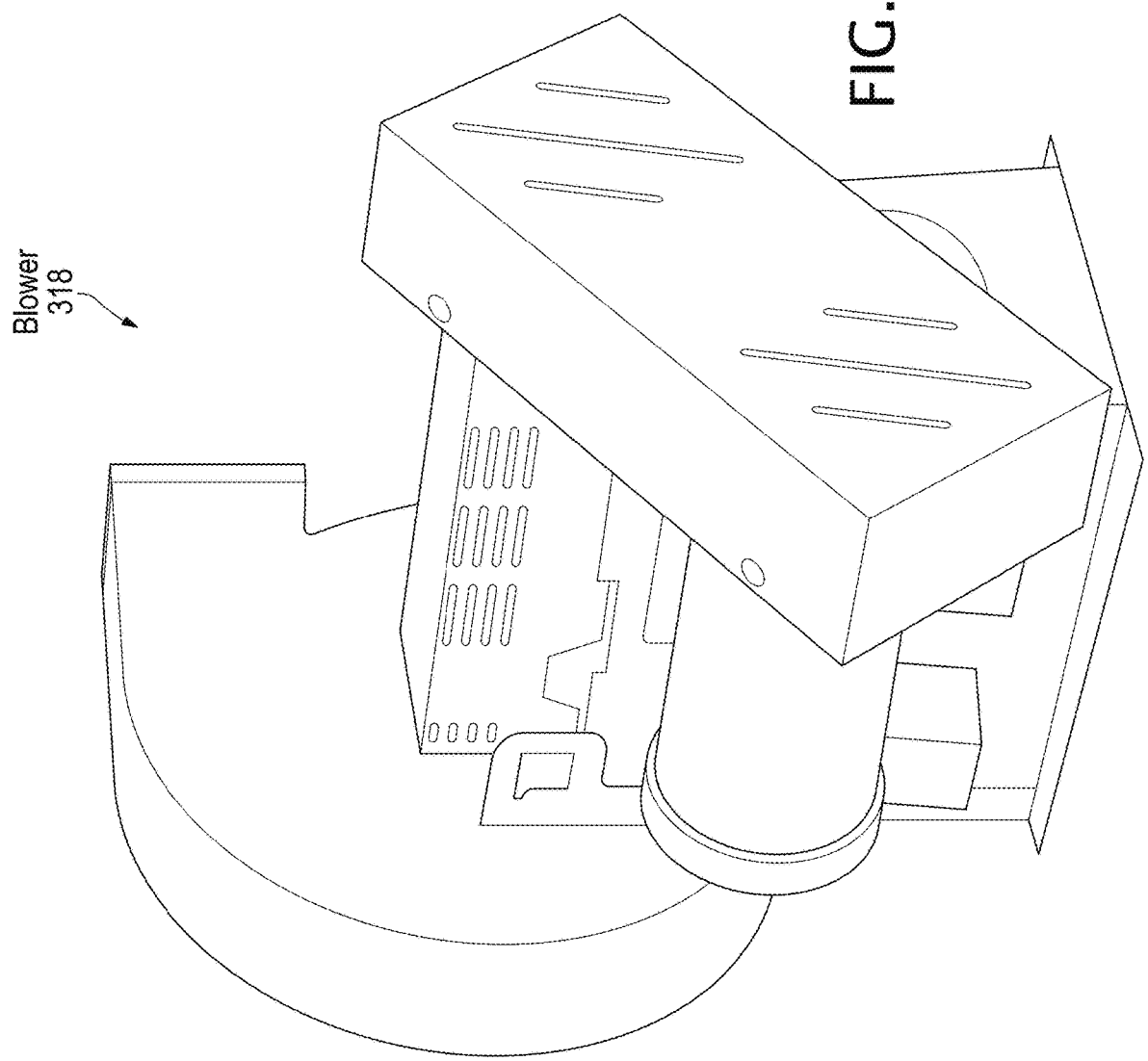
FIG. 8 shows an example of an air blower.

FIG. 8 shows an example of an air blower. The air blower is conventionally constructed and typically has an output sufficient to circulate air to large molds, as is known to those skilled in the art. The speed of the blower may be variable as controlled by the controller (310 of FIG. 3).

Figure 9:
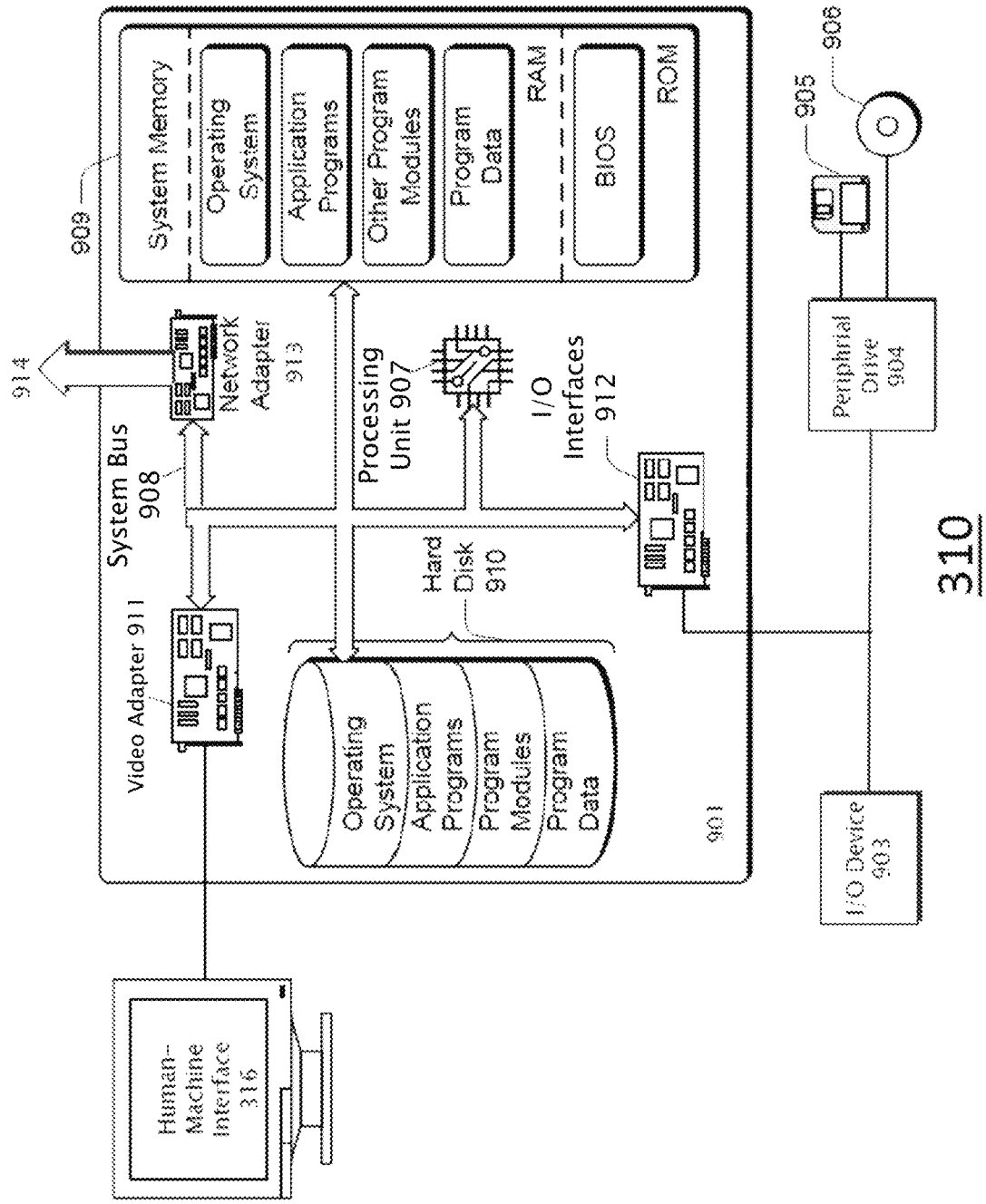
FIG. 9 shows a block diagram of the control subsystem.

FIG. 9 illustrates an exemplary control subsystem 310 in which the scalable tooling system using parallel convection heating for processing of high temperature composite materials described in this application, may be implemented. Exemplary control subsystem 310 is only one example of a computing system and is not intended to limit the examples described in this application to this particular computing environment.

For example the control subsystem 310 can be implemented with numerous other general purpose or special purpose computing system configurations. Examples of well known computing systems, may include, but are not limited to, personal computers, hand-held or laptop devices, microprocessor-based systems, multiprocessor systems, and the like.

The control subsystem 310 includes a general-purpose computing system in the form of a computing device 901. The components of computing device 901 can include one or more processors (including CPUs, GPUs, microprocessors and the like) 907, a system memory 909, and a system bus 908 that couples the various system components. Processor 907 processes various computer executable instructions, including those to configure and operate a scalable tooling system using highly parallel convection heating for processing of high temperature composite materials and to control the operation of computing device 901 and to communicate with other electronic and computing devices (not shown). The system bus 908 represents any number of several types of bus structures, including a memory bus or memory controller, a peripheral bus, an accelerated graphics port, and a processor or local bus using any of a variety of bus architectures.

The system memory 909 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 907.

Mass storage devices 904 may be coupled to the computing device 901 or incorporated into the computing device by coupling to the buss. Such mass storage devices 904 may include a magnetic disk drive which reads from and writes to a removable, non volatile magnetic disk (e.g., a "floppy disk") 905, or an optical disk drive that reads from and/or writes to a removable, non-volatile optical disk such as a CD ROM or the like 906. Computer readable media 905, 906 typically embody computer readable instructions, data structures, program modules and the like supplied on floppy disks, CDs, portable memory sticks and the like.

Any number of program modules can be stored on the hard disk 910, Mass storage device 904, ROM and/or RAM 909, including by way of example, an operating system, one or more application programs, other program modules, and program data. Each of such operating system, application programs, other program modules and program data (or some combination thereof) may include an embodiment of the systems and methods described herein.

A human machine Interface 316 such as a display device can be connected to the system bus 908 via an interface, such as a video adapter 911. A user can interface with computing device 901 via any number of different input devices 903 such as a keyboard, pointing device, serial port, and/or the like. These and other input devices are connected to the processors 907 via input/output interfaces 912 that are coupled to the system bus 908, but may be connected by other interface and bus structures, such as a parallel port, and/or a universal serial bus (USB).

Control subsystem 310 can operate in a networked environment using connections to one or more remote computers through one or more local area networks (LANs), wide area networks (WANs) and the like. The computing device 310 is connected to a network 914 via a network adapter 913 or alternatively by a modem, DSL, ISDN interface or the like.

Figure 10:
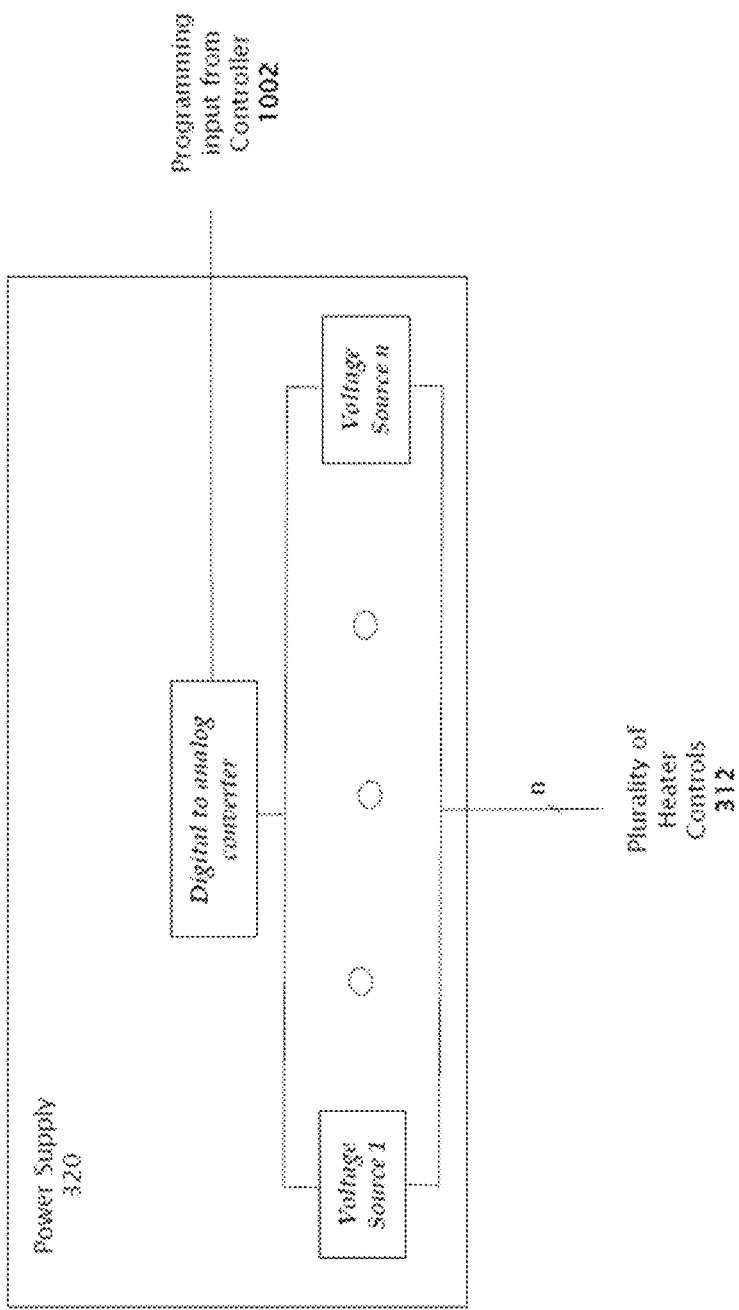
FIG. 10 shows an example of the power subsystem.
Figure 11:
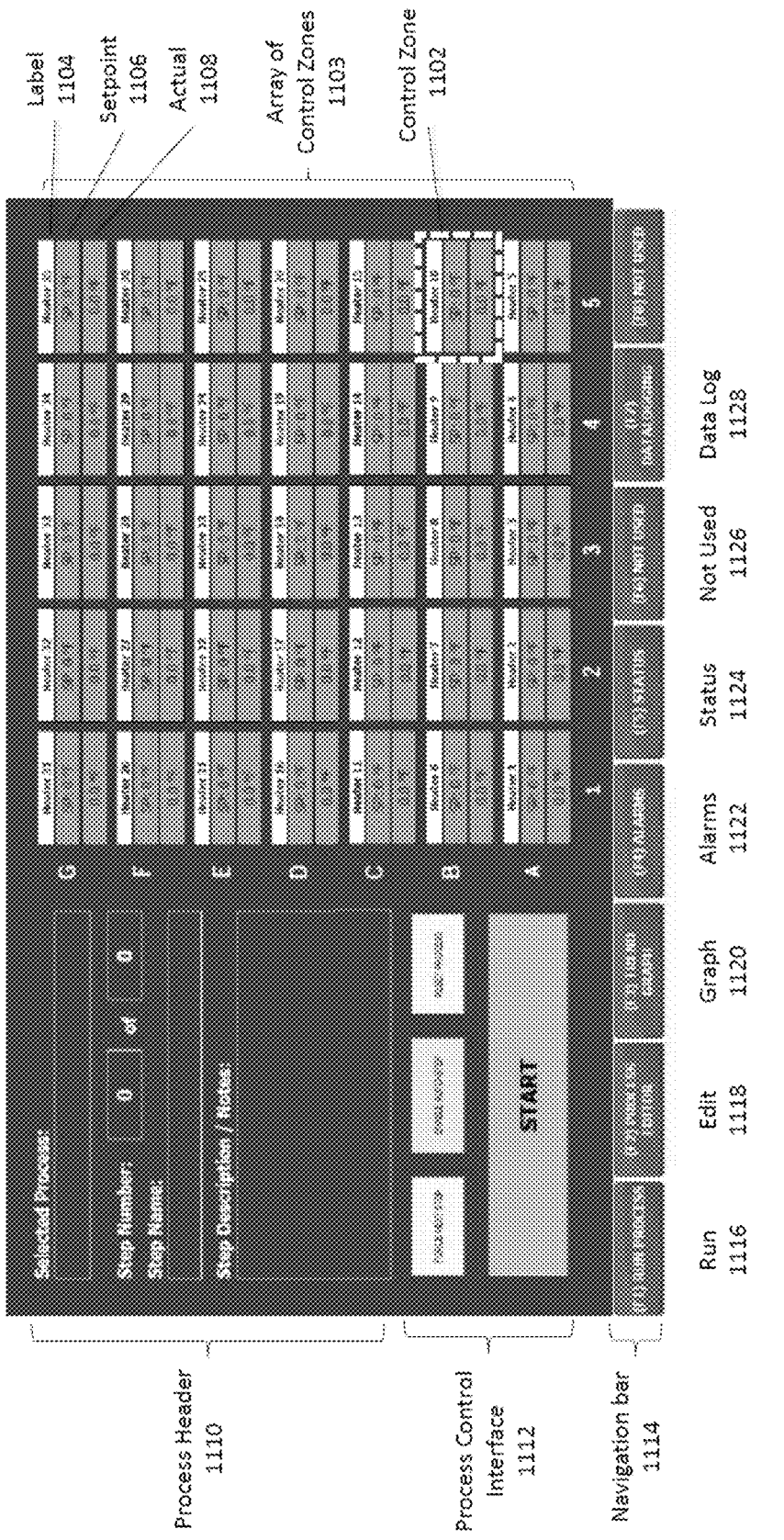
FIG. 11 shows an example of the human machine interface.

FIG. 10 shows an example of the power subsystem 320. The power subsystem is a conventionally constructed computer controlled multi output power supply having sufficient current capability to power the heater elements. Input to the power supply can be individual control signals to each of the multiple supplies, or a composite digital signal decomposed within the supply to control each output. An exemplary power supply 320 might use a digital to analog converter to decode the controller input 1002 to control individual voltage sources, generating a plurality of heater controls 312. Each power supply is typically gated either on or off. Alternatively, multiple variable output supplies may be employed with each being separately controlled. The power supplies may be AC, DC, and of either constant or variable output, FIG. 11 shows an example of a graphical user interface ("GUI") 1100 for the interactive software displayed on the human machine interface 316 that enables monitoring, controlling and logging the process (318 of FIG. 3) running on the controller (302 of FIG. 3). In this example the GUI may be displayed on a touch screen, or standard monitor. The software may be controlled using navigation tabs 1114 which present the operator with additional information or controls related to operation.

Live-monitoring of available sensor data and control inputs may be observed at each control zone 1102. A control zone consists of a zone label 1104, control setpoint 1106, and actual output 1108. The control system may be used to monitor the full array of control zones 1103. Each control zone 1102 may also indicate other control states such as heater state, airflow, or other. All data presentable for live-monitoring may be saved for future review at the data log tab 1128, or recalled for immediate review at the graph tab 1120. This data may also be available by typically available text file formats (.txt, .xlsx, .csv).

Process control programs may be input or modified via the human machine interface 316 via the edit tab 1118. The details of a program may be presented at the process header 1110 and the program started, stopped, or reset by use of the control interface 1112 as located in the run tab 1116 of the navigational bar 1114. Programs may also be imported to the controller 310 via human machine interface 316 by use of removable media (USB etc) or local-networked computers. The program may be contained in a common text file format (.txt, .xlsx, .csv) or other proprietary file format. The overall state of the machine may be monitored and controlled within the alarms tab 1122 and status tab 1124. The alarms tab 1122 may present messages regarding unexpected behavior or other erroneous conditions determined by the controller 310. The status tab 1124 allows monitoring and enabling of electrical safety contacts, power supply levels, and heater control parameters. Additional tabs may be programmed to enable specific control, monitoring, or visualization related to the operation of the machine, mold, or process.

Figure 12:
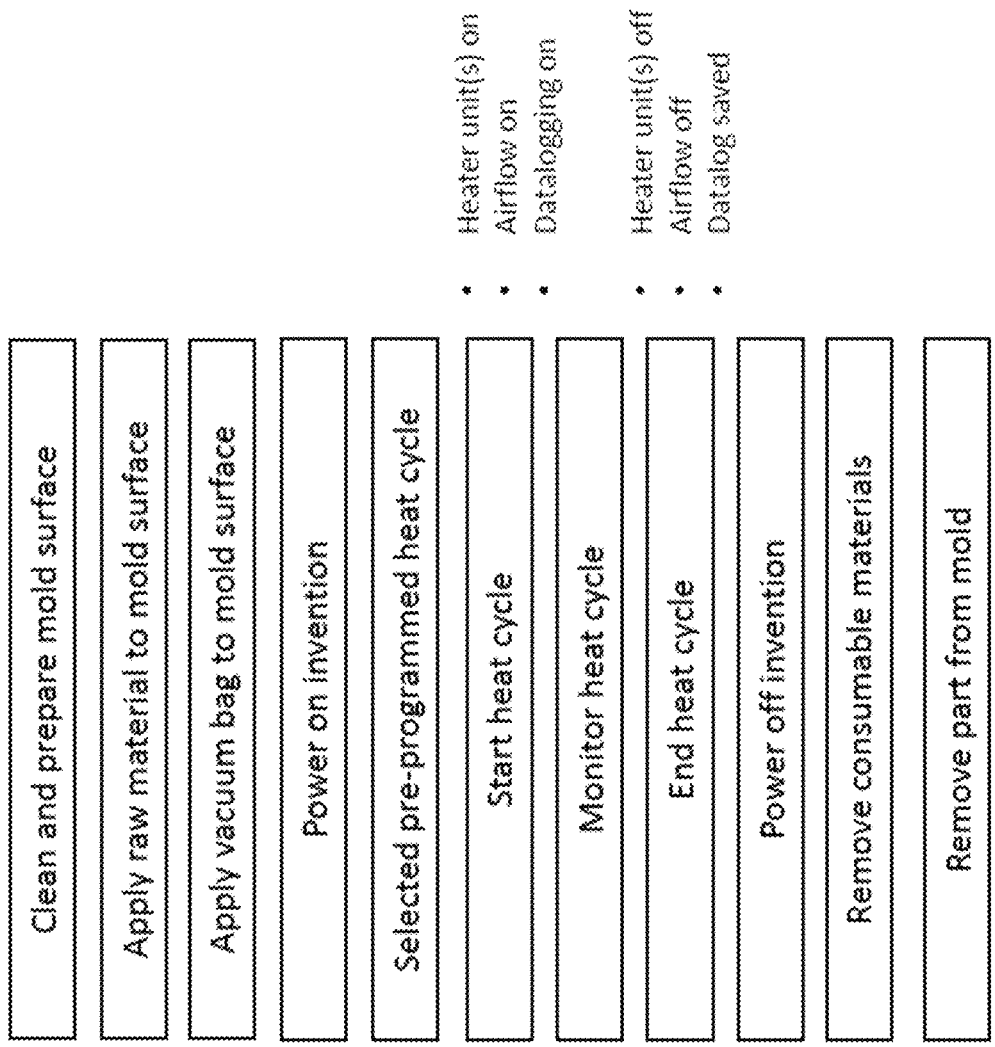
FIG. 12 shows a process of setting up molding in the tooling system using highly parallel or distributed convection heating for processing of high temperature composite materials.

FIG. 12 shows a typical process of setting up molding for composite processing as is commonly known to those skilled in the art. Prior to starting the invention, the mold is cleaned and prepared for raw material application, it is common to apply chemical agents or solid consumable materials to the mold to aid in processing and prevent stiction during part removal. Next the raw materials are place to the mold surface these materials may be applied layer-by-layer or as a preconsolidated unit. Then a vacuum bagging membrane is applied over the part and sealed to the mold surface. The membrane may be flexible or rigid, in some cases this membrane contain additional systems for monitoring and control of heat and pressure. Vacuum is applied to within the membrane to achieve consolidation pressure to the raw materials.

The invention is now ready for operation. Power is turned on to the invention and the system is given time to perform automated operation and safety checks. The user selects a desired heat cycle recipe (318 of FIG. 3) at the edit tab (1118 of FIG. 11) and begins operation of the invention at the process control interface (1112 of FIG. 11). The air blower (318 of FIG. 3) is started. Typically each heat unit 308 is automatically and individually controlled by the controller (310 of FIG. 3) using process sensor (315 of FIG. 3) and the input heat cycle recipe (318 of FIG. 3). In alternative example a plurality of heat units (315 of FIG. 3) may be controlled from one process sensor (315 of FIG. 3) or vice versa. Typically the air blower (318 of FIG. 3) and flow control gates (322 of FIG. 3) are automatically and individually controlled by the controller (310 of FIG. 3) using process sensor (315 of FIG. 3) and the input heat cycle recipe (318 of FIG. 3). All process and control data may be monitored and logged for future review.

Upon completion of the heat cycle, the air blower (318 of FIG. 3) and heat units (308 of FIG. 3) are turned off and consumables removed. Data logs of the heat cycle may be saved to storage media. The invention is powered off. The processed part is now complete and ready for further manufacturing.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A tooling system comprising:
a mold having a fist side upon which a work piece is disposed, and a second side including a grid structure with a plurality of pocketed indentations each pocket of the plurality of pocketed indentations having a bottom surface disposed against the second side, and sides encircling the bottom surface forming an open end of a pocket opposite the bottom surface;
a plurality of heated air sources, each heated air source of the plurality of air sources positioned substantially parallel to each other and outside of the pocket directing a heated air flow, towards each pocket of the plurality of pocketed indentations, whereby the heated airflow impinging on, and subsequently reflected from the pocketed indentation escapes from the open end of the pocket, and the sides tends to prevent the heated air flow from reaching an adjacent pocket such that heating of the work piece is controlled by controlling each heated air source of the plurality of air sources individually.

2. The tooling system of claim 1, in which the heated air source includes an electric heating element.

3. The tooling system of claim 1, in which the heated air source includes an orifice.

4. The tooling system of claim 1, in which the heated air source is coupled to a duct that supplies an air flow.

5. The tooling system of claim 1, in which the plurality of heated air sources is controlled electrically.

6. The tooling system of claim 1, in which the plurality of heated air sources is controlled by a controller.

7. The tooling system of claim 1, in which the indentations are formed in a grid structure.

8. The tooling system of claim 1, in which one or more of the indentations of the plurality of indentations are adjacent to each other.

9. The tooling system of claim 1, in which one or more of the indentations of the plurality of indentations are not immediately adjacent to each other.

10. A tooling system comprising:
a mold having a top surface upon which high temperature composite materials may be disposed to cure, and a back surface including a grid structure having a plurality of depressions formed in a pattern and having an open portion facing away from the back surface;
a heater array including a plurality of individual heat units arranged to match the pattern with each unit of the plurality of heat units positioned outside the open portion so that a heated air stream from each individual heat unit of the plurality of individual heat units is directed towards a corresponding depression of the plurality of depressions on the mold back surface;
a sensor array having a plurality of sensors, each sensor of the plurality of sensors disposed in a corresponding depression of the plurality of depressions and producing a plurality of sensor outputs representative of the heated air stream impinging on each sensor of the plurality of sensors;
a controller coupled to the plurality of sensor outputs, and producing a plurality of heater control signals with each heater control signal of the plurality of heater control signals controlling heating of the mold according to a mold heating profile stored in the controller.

11. The tooling system of claim 10, in which each sensor of the sensor array is a thermocouple.

12. The tooling system of claim 10, in which the individual heat units include resistance heating elements.

13. The tooling system of claim 10, in which the individual heat units include an orifice.

14. The tooling system of claim 10, in which a blower supplies air to each of the individual heat units.

* * * * *